(12) United States Patent
Chien et al.

(10) Patent No.: US 12,536,647 B2
(45) Date of Patent: Jan. 27, 2026

(54) NEURAL NETWORK-BASED IMAGE DETECTION METHOD WITH HISTOGRAM ADJUSTMENT, COMPUTING DEVICE, AND STORAGE MEDIUM

(71) Applicant: HON HAI PRECISION INDUSTRY CO., LTD., New Taipei (TW)

(72) Inventors: Yu-Hsuan Chien, New Taipei (TW); Chin-Pin Kuo, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 729 days.

(21) Appl. No.: 17/832,931

(22) Filed: Jun. 6, 2022

(65) Prior Publication Data

US 2023/0097777 A1    Mar. 30, 2023

(30) Foreign Application Priority Data

Sep. 24, 2021    (CN) .......................... 202111121998.7

(51) Int. Cl.
*G06T 7/00* (2017.01)
*G06T 5/40* (2006.01)
*G06T 7/11* (2017.01)

(52) U.S. Cl.
CPC .............. *G06T 7/001* (2013.01); *G06T 5/40* (2013.01); *G06T 7/0004* (2013.01); *G06T 7/11* (2017.01);
(Continued)

(58) Field of Classification Search
CPC ... G06T 7/001; G06T 5/40; G06T 7/11; G06T 2207/20021; G06T 2207/20081; G06T 2207/20084; G06T 5/92; G06T 7/0004
See application file for complete search history.

(56) References Cited

U.S. PATENT DOCUMENTS

2011/0182495 A1*  7/2011  Sun ........................... G06T 7/48
                                                382/141
2022/0215521 A1*  7/2022  Lee ..................... G06F 3/04847
(Continued)

FOREIGN PATENT DOCUMENTS

| CN | 111325713 | 6/2020 |
| CN | 112258459 | 1/2021 |
| CN | 113311676 | 8/2021 |

OTHER PUBLICATIONS

Ma Mingyin et al., Fabric Defect Detection Based on Image Correction and Template Segmentation, Journal of Nanjing University (Natural Science), vol. 57, No. 1, Jan. 2021, China Academic Journal Electronic Publishing House.

*Primary Examiner* — Michael P LaPage
(74) *Attorney, Agent, or Firm* — ScienBiziP, P.C.

(57) ABSTRACT

An image detection obtains first images with defects. Each of the first images is corrected and divided to obtain first sub-region images. The first sub-region images are processed to obtain processed first sub-region images. The processed first sub-region images are used to train a neural network to obtain a target mode. Second images are obtained. Each of the second images is corrected and divided to obtain second sub-region images. The second sub-region images are processed to obtain processed second sub-region images. The target model is applied to detect each of the processed second sub-region images to obtain a detection result. The method can detect defects in images accurately and efficiently.

13 Claims, 3 Drawing Sheets

(52) U.S. Cl.
CPC ............... *G06T 2207/20021* (2013.01); *G06T 2207/20081* (2013.01); *G06T 2207/20084* (2013.01)

(56) References Cited

U.S. PATENT DOCUMENTS

| | | | |
|---|---|---|---|
| 2022/0222803 A1* | 7/2022 | Lin | G06T 7/337 |
| 2023/0012917 A1* | 1/2023 | Basistyy | G06T 5/20 |
| 2023/0070333 A1* | 3/2023 | Tsubaki | G06T 7/0004 |

* cited by examiner

NEURAL NETWORK-BASED IMAGE DETECTION METHOD WITH HISTOGRAM ADJUSTMENT, COMPUTING DEVICE, AND STORAGE MEDIUM

FIELD

The subject matter herein generally relates to image processing, specifically an image detection method, a computing device, and a storage medium.

BACKGROUND

A method for detecting defects of products is to detect whether there are defects (such as misprinted letters and numbers) appearing in images of the products. However, detection of defects in images are sometime inaccurate.

BRIEF DESCRIPTION OF THE DRAWINGS

In order to more clearly describe the technical solutions in the embodiments of the present disclosure or the prior art, the following will briefly introduce the drawings that need to be used in the description of the embodiments or the prior art. Obviously, the drawings in the following description are only examples. For those of ordinary skill in the art, other drawings can be obtained according to the provided drawings without creative work.

DETAILED DESCRIPTION

For clarity, of illustration of objectives, features and advantages of the present disclosure, the drawings combined with the detailed description illustrate the embodiments of the present disclosure hereinafter. It is noted that embodiments of the present disclosure and features of the embodiments can be combined, when there is no conflict.

Various details are described in the following descriptions for better understanding of the present disclosure. However, the present disclosure may also be implemented in other ways other than those described herein. The scope of the present disclosure is not to be limited by the specific embodiments disclosed below.

Unless defined otherwise, all technical and scientific terms used herein have the same meaning as commonly understood by one of ordinary skill in the art to which the present disclosure belongs. The terms used herein in the present disclosure are only for the purpose of describing specific embodiments, and are not intended to limit the present disclosure.

Figure 1:
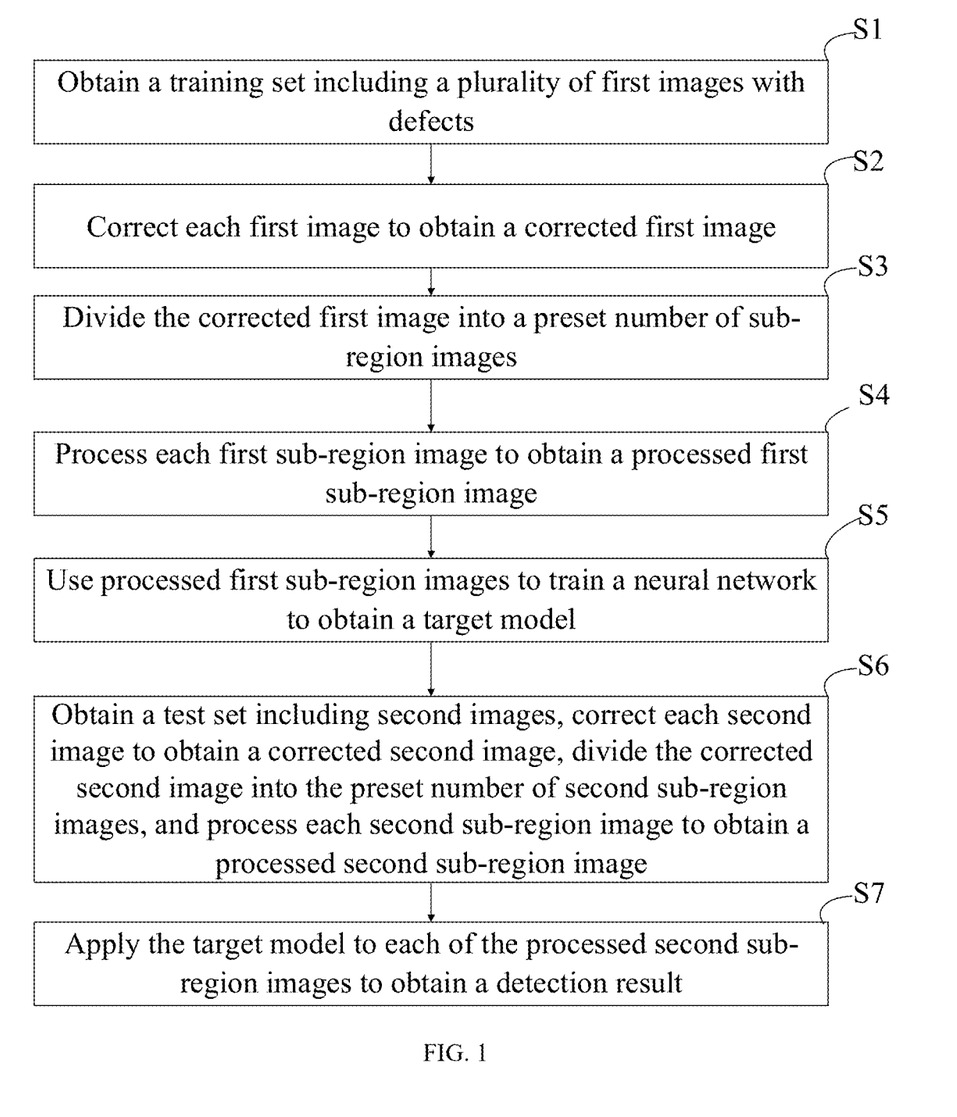
FIG. 1 is a flowchart of an image detection method provided in one embodiment of the present disclosure.

FIG. 1 is a flowchart of an image detection method in one embodiment. The method can detect defects in images accurately and efficiently. According to different requirements, the order of the blocks in the flowchart may be changed, and some blocks may be omitted.

Figure 2:
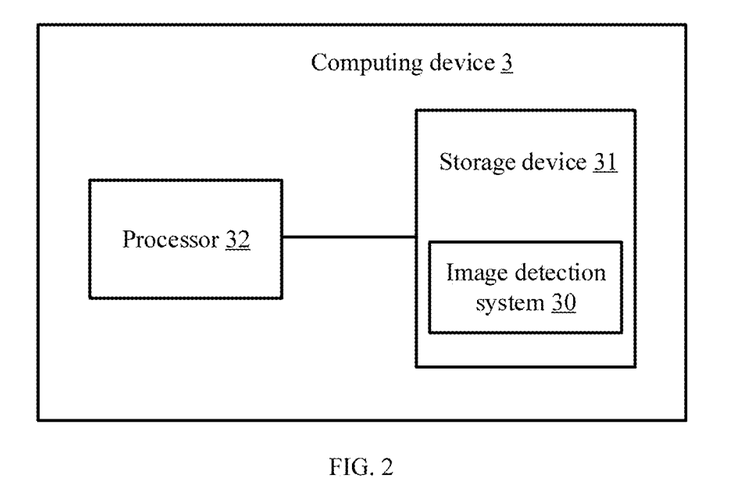
FIG. 2 is a block diagram of a computing device implementing the method in one embodiment of the present disclosure.

The method may be executed by a computing device (e.g., computing device 3 in FIG. 2). The method can be integrated in the computing device 3, or in a software development kit (SDK) run in the computing device 3.

In block S1, the computing device obtains a training set. The training set includes a plurality of first images with defects.

In one embodiment, the computing device obtains the training set in response to a user input. The training set may be pre-stored in a storage device of the computing device or connected to the computing device. Each first image in the training set may be an image of a defective product. In one embodiment, each first image contains misprinted characters associated with the product.

In block S2, the computing device corrects each first image to obtain a corrected first image.

In one embodiment, the computing device may obtain a first reference image without defects in response to a user input, and correct the first images according to the first reference image. The first reference image may be pre-stored in a storage device of the computing device or connected to the computing device. The first reference image may be an image of a product which is flawless.

In one embodiment, the computing device performs geometric correction on the first images using a scale-invariant feature transform (SIFT) algorithm. The geometric correction compensates for distortion of images (such as the first images).

In performing the geometric correction on a first image, the computing device may obtain a plurality of first feature points in the first image (for example, points where texture changes drastically, corner points, intersections of straight lines, and isolated points in simple areas in the first image) and a plurality of second feature points in the first reference image (for example, points where texture changes drastically, corner points, intersections of straight lines, and isolated points in simple areas in the first reference image). The computing device establishes a relationship between the first feature points and the second feature points using a matrix matching algorithm, so that a plurality of first feature point pairs are obtained. Each first feature point pair include a first feature point and a corresponding second feature point. The computing device removes feature point pairs that are incorrectly matched using a random sample consensus (RANSAC) algorithm, so that only first target feature point pairs that are correctly matched are obtained. Based on the first target feature point pairs, a first correction matrix of the first defective image is calculated. Based on the first correction matrix, the computing device corrects the first image.

In one embodiment, a size of the corrected first image and a size of the first reference image are the same.

In block S3, the computing device divides the corrected first image into a preset number of sub-regions ("first sub-region images").

Figure 3:
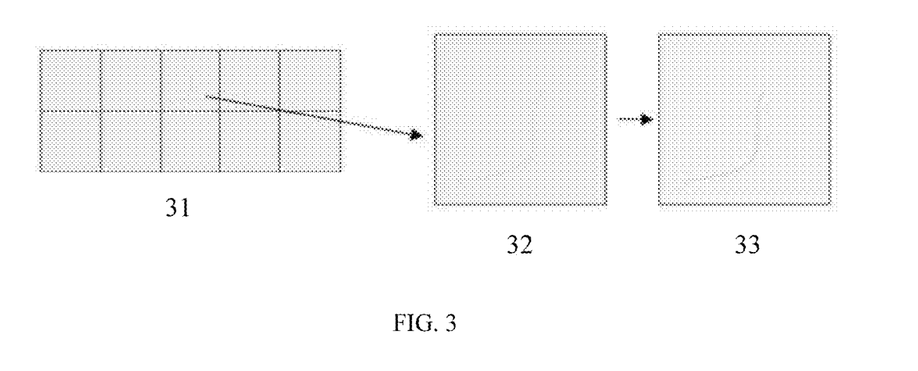
FIG. 3 shows a corrected first image divided into first sub-region images and enhancing a first sub-region image.

In one embodiment, the computing device may divide the corrected first image into M×N first sub-region images, and establish a relationship between the corrected first image and the first sub-region images. Sizes of all the M×N first sub-region images are the same. For example, the computing device divides the corrected first image into 5×2 first sub-region images. FIG. 3 shows a corrected first image divided into first sub-region images. In FIG. 3, part-image 3A denotes a corrected first image. Part-image 3A shows 10 first sub-region images. Part-image 3B denotes one of the ten first sub-region images.

In block S4, the computing device processes each first sub-region image to obtain a processed first sub-region image.

In one embodiment, the computing device adjusts a contrast of each first sub-region image.

In one embodiment, the computing device obtains a first grayscale histogram of the first sub-region image, adjusts the first grayscale histogram according to a first threshold (denoted as H), and uses a histogram equalization algorithm to adjust the contrast of the first sub-region image according to adjusted first grayscale histogram.

Figure 4:
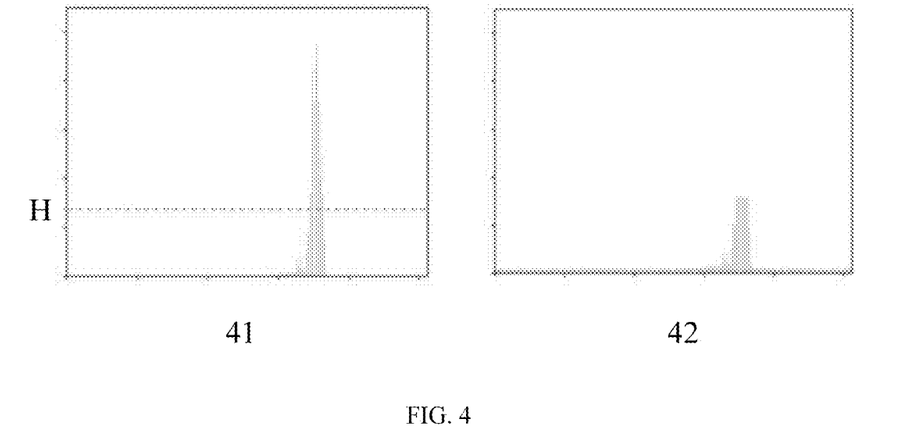
FIG. 4 shows a first grayscale histogram and an adjusted first grayscale histogram.

In one embodiment, a horizontal axis of the first grayscale histogram of the first sub-region image represents pixel value (denoted as x1), and a vertical axis of the first grayscale histogram represents pixel quantity. The pixel value is an integer between zero and 255 inclusive. A first grayscale histogram 4A of the first sub-region image 3B of FIG. 3 is shown in FIG. 4.

In one embodiment, according to the first grayscale histogram, the computing device determines a pixel quantity $b_{x1}$ corresponding to pixel values that are greater than the first threshold. An adjusted pixel quantity $b'_{x1}$ can be calculated as follows:

$$b'_{x1} = \frac{\sum_{H < b_{x1}} (b_{x1} - H)}{256} + b_{x1}.$$

The first threshold H can be proportional to a total pixel quantity in the first sub-region image. In one example, a width of the first sub-region image is 640 (pixels), a height of the first sub-region image is 480 (pixels), the total pixel quantity of the first sub-region image is 640×480=307200, and the first threshold H is 2000. FIG. 4 shows a first grayscale histogram and an adjusted first grayscale histogram. In FIG. 4, the first grayscale histogram 4A is adjusted to obtain an adjusted first grayscale histogram 4B.

In one embodiment, the computing device calculates a first cumulative distribution function as follows:

$$cdf(x1) = \sum_{0}^{x1} b'_{x1},$$

where cdf (x1) denotes the first cumulative distribution function.

The computing device uses the first cumulative distribution function to update the pixel value x1 to obtain a updated pixel value h(x1):

$$h(x1) = \text{round}\left(\frac{cdf(x1) - 1}{W1 \times H1} \times 255\right);$$

where round denotes a round-off function, W1 denotes a width of the first sub-region image (e.g., 640), and H1 denotes a height of the first sub-region image (e.g., 480).

The computing device updates the pixel value x in the first sub-region image according to the updated pixel value h(x1) to obtain the processed first sub-region image. In one embodiment, the computing device enhances the first sub-region image, and establishes a relationship between corrected first images and processed first sub-region images. FIG. 3 shows the first sub-region image 3B enhanced, obtaining a processed first sub-region image 3C.

In block S5, the computing device uses processed first sub-region images to train a neural network to obtain a target model.

In one embodiment, the computing device uses the processed first sub-region images to train the neural network (such as a convolutional neural network) to obtain the detection model, and determines whether the detection model meets a preset requirement (e.g., epochs of the detection model is equal or great than 1000). If the detection model meets the preset requirement, the detection model is determined as the target model.

In block S6, the computing device obtains a test set including second images, corrects each second image to obtain a corrected second image, divides the corrected second image into the preset number of second sub-region images, and processes each second sub-region image to obtain a processed second sub-region image.

In one embodiment, the computing device obtains the test set in response to a user input. The test set includes one or more second images. The test set may be pre-stored in a storage device of the computing device or connected to the computing device. The second images may be images of products to be detected. The test set also include a plurality of second reference images without defects corresponding to the second images. The second reference images do not need to be corrected, and are directly divided into third sub-region images. The computing device establishes a relationship between the second reference images and the third sub-region images. Sizes of the first sub-region images are the same as sizes of the third sub-region images.

In one embodiment, the computing device performs geometric correction on the second images using the SIFT algorithm.

In performing the geometric correction on a second image, the computing device may obtain a plurality of third feature points in the second image (for example, points where texture changes drastically, corner points, intersections of straight lines, and isolated points in simple areas in the second image) and a plurality of fourth feature points in a second reference image (for example, points where texture changes drastically, corner points, intersections of straight lines, and isolated points in simple areas in the second reference image). The computing device establishes a relationship between the third feature points and the fourth feature points using a matrix matching algorithm, so that a plurality of second feature point pairs are obtained. Each second feature point pair include a third feature point and a corresponding fourth feature point. The computing device removes feature point pairs that are incorrectly matched from the second feature point pairs using the RANSAC algorithm, so that only second target feature point pairs that are correctly matched are obtained. Based on the second target feature point pairs, a second correction matrix of the second image is calculated. Based on the second correction matrix, the computing device corrects the second image.

In one embodiment, a size of the corrected second image and a size the second reference image are the same, and a size of the first reference image and a size the second reference image are the same. Therefore, the size of the corrected second image and the size of the corrected first image are the same.

In one embodiment, the computing device may divide the corrected second image into M×N second sub-region images, and establish a relationship between the corrected second image and the second sub-region images. Sizes of the M×N second sub-region images are the same. The computing device divides the corrected second image into 5×2 second sub-region images. The size of the second sub-region images may be the same as that of the first sub-region images.

In one embodiment, the computing device adjusts a contrast of each second sub-region image.

In one embodiment, the computing device obtains a second grayscale histogram of the second sub-region image, adjusts the second grayscale histogram according to the first threshold, and uses the histogram equalization algorithm to adjust the contrast of the second sub-region image according to adjusted second grayscale histogram.

In one embodiment, a horizontal axis of the second grayscale histogram of the second sub-region image represents pixel value (denoted as x2), and a vertical axis of the second grayscale histogram represents pixel quantity.

In one embodiment, according to the second grayscale histogram, the computing device determines a pixel quantity bx2 corresponding to pixel values that are greater than the second threshold. An adjusted pixel quantity b'x2 can be calculated as follows:

$$d'_{x2} = \frac{\sum_{H<b_{x2}}(d_{x2} - H)}{256} + d_{x2}.$$

In one embodiment, the computing device calculates a second cumulative distribution function as follows:

$$cdf_2(x2) = \sum_{0}^{x2} d'_{x2},$$

where $cdf_2(x2)$ denotes the second cumulative distribution function.

The computing device uses the second cumulative distribution function to update the pixel value x to obtain a updated pixel value g(x2):

$$g(x2) = \text{round}\left(\frac{cdf_2(x2) - 1}{W2 \times H2} \times 255\right),$$

where round denotes a round-off function, W2 denotes a width of the second sub-region image (e.g., 640), and H2 denotes a height of the second sub-region image (e.g., 480).

The computing device updates the pixel value x2 in the second sub-region image according to the updated pixel value g(x2) to obtain the processed second sub-region image. In one embodiment, the computing device enhances the second sub-region image, and establishes a relationship between corrected second images and processed second sub-region images.

In block S7, the computing device applies the target model to detect each of the processed second sub-region images to obtain a detection result.

Figure 5:
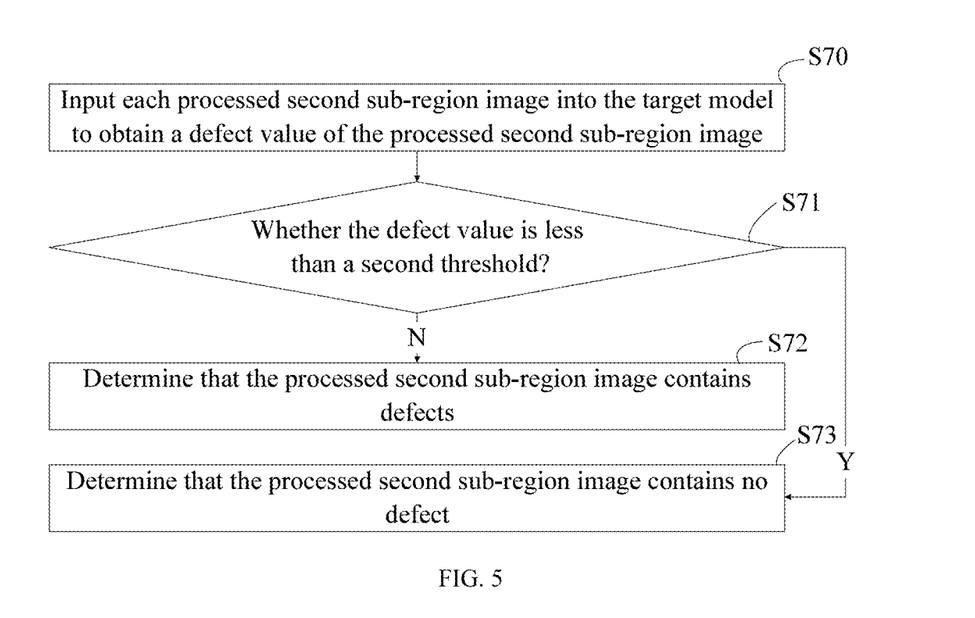
FIG. 5 is a detailed flowchart of S7 of the method in FIG. 1.

FIG. 5 is a detailed flowchart of S7 in FIG. 1.

In block S70, the computing device inputs each processed second sub-region image into the target model to obtain a defect value of the processed second sub-region image. A range of the defect value may be [0, 1].

In one embodiment, the computing device may further input each third sub-region image into the target model for detection.

In block S71, the computing device compares the defect value to a second threshold. If the defect value is greater than or equal to the second threshold, the process goes to block S72. If the defect value is less than the second threshold, the process goes to block S73.

The second threshold can be 0.05.

In block S72, the computing device determines that the processed second sub-region image contains defects (such as a misprinted character).

When it is determined that the processed second sub-region image contains defects, a corrected second image corresponding to the processed second sub-region image is deemed defective, so that a corresponding second image is determined to be defective.

In block S73, the computing device determines that the processed second sub-region image contains no defect.

When it is determined that no processed second sub-area image contains defects, it is determined that the corrected second image corresponding to the processed second sub-area image is flawless, so that the corresponding second image is determined to be flawless.

FIG. 1 describes in detail the image detection method of the present disclosure. Hardware architecture that implements the image detection method is described in conjunction with FIG. 2.

FIG. 2 is a block diagram of a computing device implementing the method in one embodiment of the present disclosure. The computing device 3 may include a storage device 31 and at least one processor 32. An image detection system 30 may be stored in the storage device 31 and executed by the processor 32. The processor 32 may execute the image detection system 30 to implement the blocks in the image detection method described above, such as the blocks S1 to S11 in FIG. 1.

The computing device 3 may be a device that can perform processing according to preset or stored instructions, such as a desktop computer, a notebook, a palmtop computer, or a cloud server. Hardware of the computing device may include, but is not limited to, a microprocessor, an application-specific integrated circuit (ASIC), a field-programmable gate array (FPGA), a digital signal processor (DSP), an embedded device, etc.

Those skilled in the art will understand that computing device 3 is only an example, and does not constitute a limitation. Other examples of computing device 3 may include more or fewer components than shown in FIG. 5, or may combine some components, or may have different components.

The storage device 31 may be used to store the image detection system 30, and the processor 32 implements the computing device by running or executing the image detection system 30 or module stored in the storage device 31 and calling up data stored in the storage device 31. The storage device 31 may include a storage area for programs and a storage area for data. The storage program area may store an operating system, and programs required by at least one function, etc.; the storage data area may store data and the like created in the use of the computing device 3. In addition, the storage device 31 may include non-volatile memory, such as a hard disk, a memory, a plug-in hard disk, a smart memory card (SMC), a secure digital (SD) card, a flash memory card (Flash Card), at least one magnetic disk storage device, flash memory device, or other non-volatile solid state storage device.

The processor 32 may be a central processing unit (CPU) or other general-purpose processor, a digital signal processor (DSP), an application-specific integrated circuit (ASIC), a field-programmable gate array (FPGA) or other programmable logic device, a discrete gate, or a transistor logic device, or a discrete hardware component, etc. The processor 32 may be a microprocessor or any conventional processor. The processor 32 may be a control center of the computing device 3, and connect various parts of the entire computing device 3 by using various interfaces and lines.

In an exemplary embodiment, the image detection system 30 may be divided into one or more modules, and the one or more modules are stored in the storage device 31 and executed by the processor 32 to complete the method of the present disclosure. The one or more modules can be a series of computer-readable instruction segments capable of performing specific functions, and the instruction segments are used to describe execution processes of the image detection system 30 in the computing device 3.

When the modules integrated in the computing device 3 are implemented in the form of software functional units and used as independent units, they can be stored in a non-transitory readable storage medium. According to this understanding, all or part of the processes in the methods of the above embodiments implemented by the present disclosure can also be completed by related hardware instructed by computer-readable instructions. The computer-readable instructions may be stored in a non-transitory readable storage medium. The computer-readable instructions, when executed by the processor, may implement the blocks of the foregoing method embodiments. The computer-readable instructions include computer-readable instruction codes, and the computer-readable instruction codes can be source code, object code, an executable file, or in some other intermediate form. The non-transitory readable storage medium may include any entity or device capable of carrying the computer-readable instruction code, a recording medium, a U disk, a mobile hard disk, a magnetic disk, an optical disk, a computer memory, and a read-only memory (ROM).

Although not shown, the computing device 3 may also include a power source (such as a battery) for supplying power to various components. The power source may be connected to the at least one processor 32 through a power management device, so as to realize functions such as charging, discharging, and power consumption management. The power supply may also include direct current or alternating current power supplies, recharging devices, power failure detection circuits, power converters or inverters, and power status indicators. The computing device 3 may also include various sensors, BLUETOOTH modules, WI-FI modules, etc.

In several embodiments provided in the preset disclosure, it should be understood that the disclosed computing device and method may be implemented in other ways. For example, the embodiments of the computing device described above are merely illustrative. For example, the units are only divided according to logical function, and there may be other manner of division in actual implementation.

The modules described as separate components may or may not be physically separated, and the components displayed as modules may or may not be physical modules, that is, may be located in one place, or may be distributed on multiple network elements. Some or all of the modules may be selected according to actual needs to achieve the purpose of the solution of this embodiment.

In addition, each functional unit in each embodiment of the present disclosure can be integrated into one processing unit, or can be physically present but separate in each unit, or two or more units can be integrated into one unit. The above integrated unit can be implemented in a form of hardware or in a form of a software functional unit.

The above integrated modules implemented in the form of function modules may be stored in a storage medium. The above function modules may be stored in a storage medium, and include several instructions to enable a computing device (which may be a personal computer, server, or network device, etc.) or processor to execute the method described in the embodiment of the present disclosure.

The present disclosure is not limited to the details of the above-described exemplary embodiments, and the present disclosure can be embodied in other specific forms without departing from the spirit or essential characteristics of the present disclosure. Therefore, the present embodiments are to be considered as illustrative and not restrictive, and the scope of the present disclosure is defined by the appended claims. All changes and variations in the meaning and scope of equivalent elements are included in the present disclosure. Any reference sign in the claims should not be construed as limiting the claim. Furthermore, the word "comprising" does not exclude other units nor does the singular exclude the plural. A plurality of units or devices stated in the system claims may also be implemented by one unit or device through software or hardware. Words such as "first" and "second" are used to indicate names but not to signify any particular order.

Finally, the above embodiments are only used to illustrate technical solutions of the present disclosure, and are not to be taken as restrictions on the technical solutions. Although the present disclosure has been described in detail with reference to the above embodiments, those skilled in the art should understand that the technical solutions described in one embodiments can be modified, or some of technical features can be equivalently substituted, and that these modifications or substitutions are not to detract from the essence of the technical solutions or from the scope of the technical solutions of the embodiments of the present disclosure.

We claim:

1. An image detection method, comprising:
    obtaining a training set comprising a plurality of first images with defects;
    correcting each of the first images to obtain a corrected first image;
    dividing the corrected first image into a preset number of first sub-region images;
    processing the first sub-region images to obtain processed first sub-region images;
    using the processed first sub-region images to train a neural network to obtain a target model;
    obtaining a test set, the test set comprising a plurality of second images;
    correcting each of the second images to obtain corrected second images;
    dividing each of the corrected second images into the preset number of second sub-region images;
    processing each of the second sub-region images to obtain processed second sub-region images; and
    applying the target model to each of the processed second sub-region images to obtain a detection result;
    wherein processing each of the first sub-region images to obtain processed first sub-region images comprises:
    adjusting a contrast of each first sub-region image, comprising:
    obtaining a first grayscale histogram of the first sub-region image, a horizontal axis of the first grayscale histogram of the first sub-region image representing pixel value, and a vertical axis of the first grayscale histogram representing pixel quantity;

adjusting the first grayscale histogram according to a first threshold; and using a histogram equalization algorithm to adjust the contrast of the first sub-region image according to adjusted first grayscale histogram;

wherein adjusting the first grayscale histogram according to the first threshold comprises:

determining a pixel quantity corresponding to pixel values that are greater than the first threshold according to the first grayscale histogram, and obtaining a determined pixel quantity; and calculating an adjusted pixel quantity based on the determined pixel quantity.

2. The method of claim 1, wherein calculating the adjusted pixel quantity based on the determined pixel quantity as follows:

$$b'_{x1} = \frac{\sum_{H<b_{x1}}(b_{x1}-H)}{256} + b_{x1},$$

wherein $b'_{x1}$ denotes the adjusted pixel quantity, H denotes the first threshold, $b_{x1}$ denotes the determined pixel quantity corresponding to pixel values x1 that are greater than the first threshold.

3. The method of claim 2, wherein using the histogram equalization algorithm to adjust the contrast of the first sub-region image according to adjusted first grayscale histogram comprises:

calculating a cumulative distribution function as follows:

$$cdf(x1) = \Sigma_0^{x1} b'_{x1},$$

wherein cdf(x1) denotes the cumulative distribution function; and using the cumulative distribution function to update the pixel value x1 to obtain the updated pixel value h(x1) as follows:

$$h(x1) = \text{round}\left(\frac{cdf(x1)-1}{W1 \times H1} \times 255\right);$$

wherein round denotes a round-off function, W1 denotes a width of the first sub-region image, and H1 denotes a height of the first sub-region image.

4. The method of claim 1, wherein using the processed first sub-region images to train a neural network to obtain a target model comprises:

using the processed first sub-region images to train the neural network to obtain a detection model; and determining that the detection model is the target model when the detection model meets a preset requirement.

5. The method of claim 1, wherein applying the target model to detect each of the processed second sub-region images to obtain a detection result comprises:

inputting each processed second sub-region image into the target model to obtain a defect value of the processed second sub-region image;

comparing the defect value to a second threshold;

determining that the processed second sub-region image contains defects when the defect value is greater than or equal to the second threshold; and determining that the processed second sub-region image contains no defect when the defect value is less than the second threshold.

6. A computing device comprising:

at least one processor; and a storage device storing computer-readable instructions, which when executed by the at least one processor, cause the at least one processor to:

obtain a training set comprising a plurality of first images with defects;

correct each of the first images to obtain a corrected first image;

divide the corrected first image into a preset number of first sub-region images;

process the first sub-region images to obtain processed first sub-region images;

use the processed first sub-region images to train a neural network to obtain a target model;

obtain a test set, the test set comprising a plurality of second images;

correct each of the second images to obtain corrected second images;

divide each of the corrected second images into the preset number of second sub-region images;

process each of the second sub-region images to obtain processed second sub-region images; and apply the target model to each of the processed second sub-region images to obtain a detection result;

wherein the at least one processor processes each of the first sub-region images to obtain processed first sub-region images by:

adjusting a contrast of each first sub-region image, comprising:

obtaining a first grayscale histogram of the first sub-region image, a horizontal axis of the first grayscale histogram of the first sub-region image representing pixel value, and a vertical axis of the first grayscale histogram representing pixel quantity;

adjusting the first grayscale histogram according to a first threshold; and using a histogram equalization algorithm to adjust the contrast of the first sub-region image according to adjusted first grayscale histogram;

wherein adjusting the first grayscale histogram according to the first threshold comprises:

determining a pixel quantity corresponding to pixel values that are greater than the first threshold according to the first grayscale histogram, and obtaining a determined pixel quantity; and calculating an adjusted pixel quantity based on the determined pixel quantity.

7. The computing device of claim 6, wherein the at least one processor calculates the adjusted pixel quantity based on the determined pixel quantity as follows:

$$b'_{x1} = \frac{\sum_{H<b_{x1}}(b_{x1}-H)}{256} + b_{x1},$$

wherein $b'_{x1}$ denotes the adjusted pixel quantity, H denotes the first threshold, $b_{x1}$ denotes the determined pixel quantity corresponding to pixel values x1 that are greater than the first threshold.

8. The computing device of claim 7, wherein the at least one processor is further caused to:
calculate a cumulative distribution function as follows:

$$cdf(x1)=\Sigma_0^{x1} b'_{x1},$$

wherein cdf(x1) denotes the cumulative distribution function; and
use the cumulative distribution function to update the pixel value x1 to obtain the updated pixel value h(x1) as follows:

$$h(x1) = \text{round}\left(\frac{cdf(x1)-1}{W1 \times H1} \times 255\right),$$

wherein round denotes a round-off function, W1 denotes a width of the first sub-region image, and H1 denotes a height of the first sub-region image.

9. The computing device of claim 6, wherein the at least one processor is further caused to:
input each processed second sub-region image into the target model to obtain a defect value of the processed second sub-region image;
compare the defect value to a second threshold;
determine that the processed second sub-region image contains defects when the defect value is greater than or equal to the second threshold; and
determine that the processed second sub-region image contains no defect when the defect value is less than the second threshold.

10. A non-transitory storage medium having stored thereon computer-readable instructions that, when the computer-readable instructions are executed by a processor to implement the following method:
obtaining a training set comprising a plurality of first images with defects;
correcting each of the first images to obtain a corrected first image;
dividing the corrected first image into a preset number of first sub-region images;
processing the first sub-region images to obtain processed first sub-region images;
using the processed first sub-region images to train a neural network to obtain a target model;
obtaining a test set, the test set comprising a plurality of second images;
correcting each of the second images to obtain corrected second images;
dividing each of the corrected second images into the preset number of second sub-region images;
processing each of the second sub-region images to obtain processed second sub-region images; and
applying the target model to each of the processed second sub-region images to obtain a detection result;
wherein processing each of the first sub-region images to obtain processed first sub-region images comprises:
adjusting a contrast of each first sub-region image, comprising:
obtaining a first grayscale histogram of the first sub-region image, a horizontal axis of the first grayscale histogram of the first sub-region image representing pixel value, and a vertical axis of the first grayscale histogram representing pixel quantity;
adjusting the first grayscale histogram according to a first threshold; and
using a histogram equalization algorithm to adjust the contrast of the first sub-region image according to adjusted first grayscale histogram;
wherein adjusting the first grayscale histogram according to the first threshold comprises:
determining a pixel quantity corresponding to pixel values that are greater than the first threshold according to the first grayscale histogram, and obtaining a determined pixel quantity; and
calculating an adjusted pixel quantity based on the determined pixel quantity.

11. The non-transitory storage medium of claim 10, wherein calculating the adjusted pixel quantity based on the determined pixel quantity as follows:

$$b'_{x1} = \frac{\sum_{H<b_{x1}} (b_{x1}-H)}{256} + b_{x1},$$

wherein $b'_{x1}$ denotes the adjusted pixel quantity, H denotes the first threshold, $b_{x1}$ denotes the determined pixel quantity corresponding to pixel values x1 that are greater than the first threshold.

12. The non-transitory storage medium of claim 11, wherein using the histogram equalization algorithm to adjust the contrast of the first sub-region image according to adjusted first grayscale histogram comprises:
calculating a cumulative distribution function as follows:

$$cdf(x1)=\Sigma_0^{x1} b'_{x1},$$

wherein cdf(x1) denotes the cumulative distribution function; and
using the cumulative distribution function to update the pixel value x1 to obtain the updated pixel value h(x1) as follows:

$$h(x1) = \text{round}\left(\frac{cdf(x1)-1}{W1 \times H1} \times 255\right),$$

wherein round denotes a round-off function, W1 denotes a width of the first sub-region image, and H1 denotes a height of the first sub-region image.

13. The non-transitory storage medium of claim 10, wherein applying the target model to detect each of the processed second sub-region images to obtain a detection result comprises:
inputting each processed second sub-region image into the target model to obtain a defect value of the processed second sub-region image;
comparing the defect value to a second threshold;
determining that the processed second sub-region image contains defects when the defect value is greater than or equal to the second threshold; and
determining that the processed second sub-region image contains no defect when the defect value is less than the second threshold.

* * * * *